UNITED STATES PATENT OFFICE.

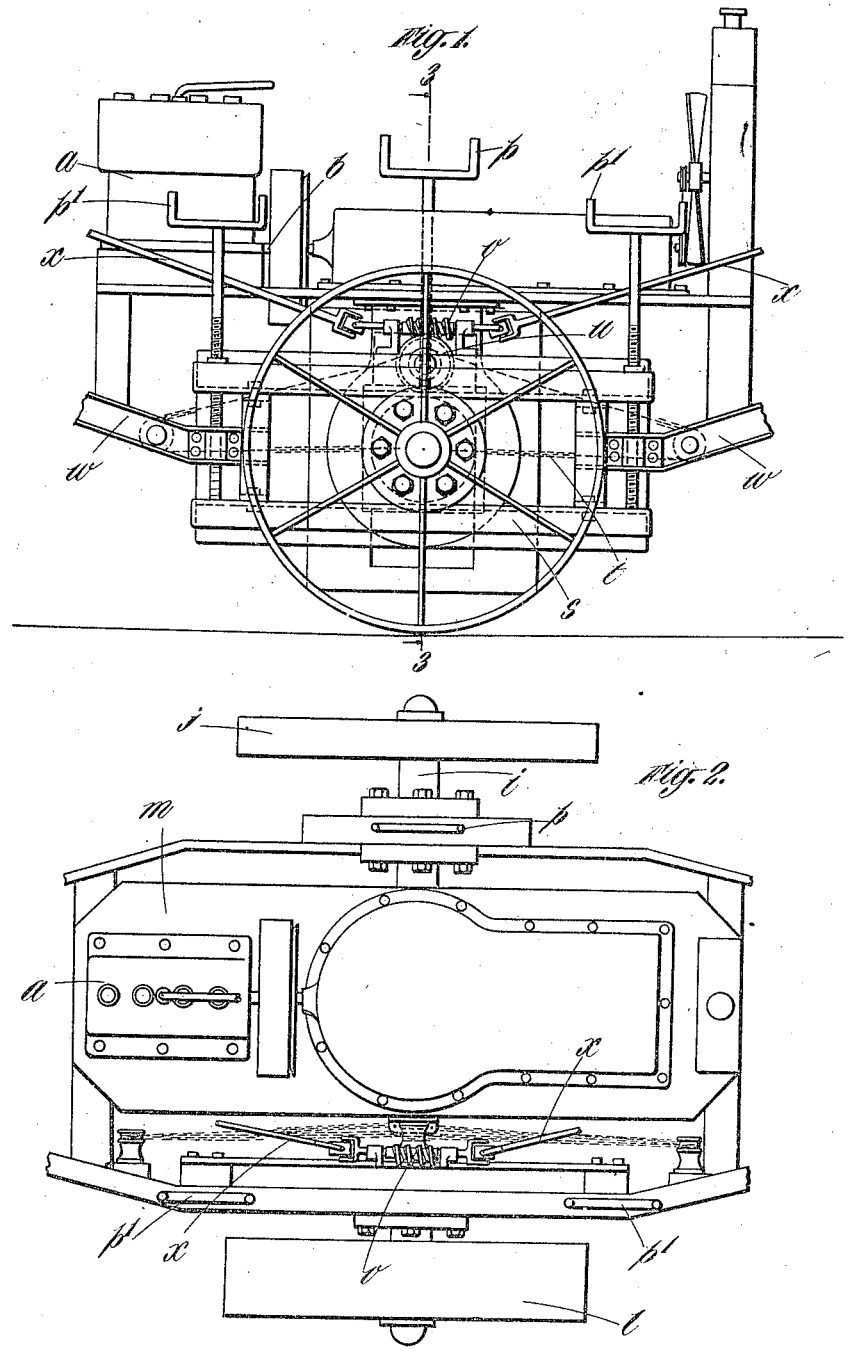

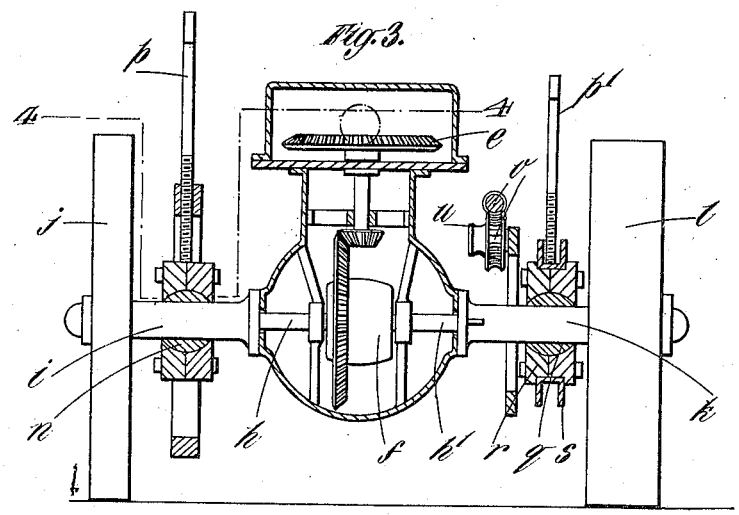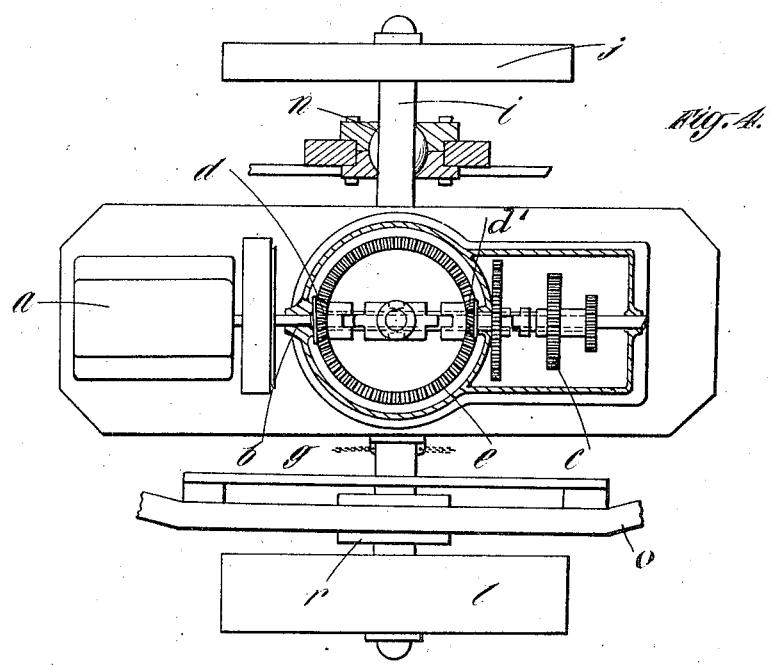

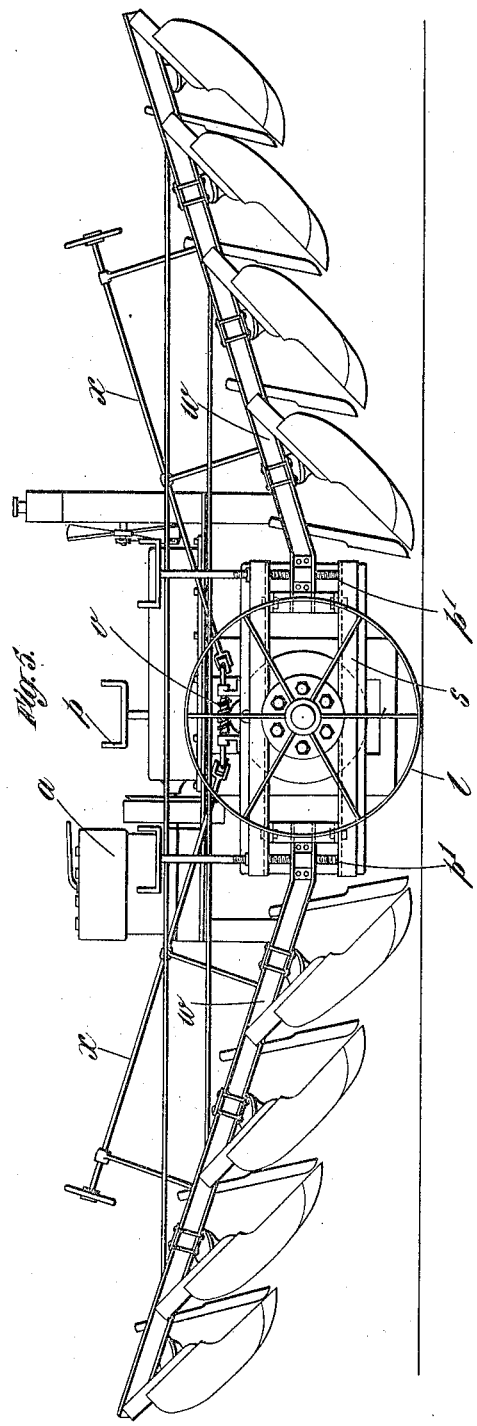

DANIEL YELD WHEATLEY, OF HYTHE, ENGLAND.

BALANCE-PLOW.

1,348,464.　　　　　　Specification of Letters Patent.　　　Patented Aug. 3, 1920.

Application filed September 29, 1917. Serial No. 193,949.

*To all whom it may concern:*

Be it known that I, DANIEL YELD WHEATLEY, a citizen of the United Kingdom of Great Britain and Ireland, and resident of "Goldenhurst," Aldington, Hythe, in the county of Kent, England, have invented certain new and useful Improvements in or Relating to Balance-Plows, of which the following is a specification, such as will enable others skilled in the art to which it appertains to make and use the same.

This invention relates to self driven plows and more particularly to those known as balance or one way plows.

It has been found in practice with self-driven plows, that certain advantages, more particularly easy steering, accrue when the engine of the plow is mounted upon a platform carried by the land wheels and which is movable in relation to the main or share-carrying frame, and my invention relates to this form of plow and consists mainly in an improved method of mounting the land and furrow wheels on the main frame, a distinctive feature of the invention being that the axle of the two said wheels is mounted at the furrow wheel side with provision for vertical adjustment, while the axle of the land wheel is mounted in a bearing which is capable of horizontal movement as well as the vertical adjustment in the frame. By this arrangement and through the medium of suitable gear for shifting the land wheel bearing horizontally, the axle turns on a vertical axis positioned on the furrow wheel side of the plow. The arrangement leaves the central part between the two wheels free for the driving gear and generally permits of convenient arrangement of the engine and mechanism connected therewith.

Any suitable steering gear capable of horizontally shifting on the land wheel side may be employed and screwing means of substantially known form may be employed to raise and lower the plow frame in relation to the wheels thereby adjusting the depth to which the shares will enter the ground.

The engine with its gearing is positioned between the land wheel and the furrow wheel and by means of the steering gear is capable, with the wheels, of movement about a vertical axis which is positioned on the furrow wheel side of the plow. This movement is effected by the usual steering rods through suitable gear, it being obvious that as the land wheel is advanced or withdrawn in relation to the furrow wheel the direction of the plow is altered.

According to the invention the engine with its gear are positioned between the land wheel and the furrow wheel of the plow and are capable with the wheels of movement about a vertical axis in relation to the main plow frame, said vertical axis being positioned on the furrow wheel side of the plow.

The engine drives through a differential or other suitable gear preferably a variable speed gear having the same speed in both directions.

Various means may be employed for mounting the axle of the land wheel upon the main frame so as to permit of the necessary movement in relation to the main frame. One such means is shown in the accompanying drawings but others may be adopted and various modifications from those shown may be employed.

In the drawings:—

Figure 1 shows the central portion of a plow with the invention in side elevation as seen from the land wheel side, the ends of the plow being omitted.

Fig. 2 is a plan view of the plow as shown in Fig. 1.

Fig. 3 is a part vertical section at the line 3—3—of Fig. 1, with the wheels and axle sleeves in elevation, and Fig. 4 shows in part sectional plan at the line 4—4 of Fig. 3 details of the driving gear and of the bearing arrangement on the furrow wheel side.

Fig. 5 is a side elevation of the whole plow.

In this example of my invention the engine *a* drives shaft *b* carrying variable speed gear *c* in usual manner. The shaft *b* also carries pinions *d* and *d'* in constant mesh with a sun wheel *e*, which as will be seen in Figs. 3 and 4 drives the differential gear *f* in either direction according to the movement of the dog clutch *g*.

The differential gear drives the usual form of shafts *h*, *h'*, which respectively pass through sleeve *i* to the furrow wheel *j* and through sleeve *k* to the land wheel *l*.

All these parts are mounted upon a frame *m* and are pivoted at *n* by a ball bearing capable of being raised and lowered in relation to the main plow frame $w$ by means of the hand screw $p$ on one side and $p'$, $p'$, on the other side.

On the land wheel side the sleeve $k$ is slidably mounted in a ball bearing $q$ held in a guide block $r$ slidably fitted within the guide frame $s$ fitted to or forming part of the side of the main frame $o$. The sleeve $k$ is connected by chains $t$ to drum $u$ which is rotatable by the worm gear $v$ from the steering bars $x$ the arrangement being such that by winding the chain on the drum the block $r$ can be pulled along the guide frame $s$ in either direction and thus the steering can be effected.

The guide frame could be an arc struck from the bearing $n$ but I prefer to make the frame flat and to permit the ball $q$ some sliding motion on the axle casing $k$.

The operation of the machine as far as it affects the understanding of the present invention is as follows:—

When it is desired to alter the depth of the furrow it is only necessary to screw up or unscrew the hand screws $p$, $p'$ $p'$ the desired amount.

Upon the plow arriving at a headland, the working shares are raised in known manner, the machine is reversed and started in the opposite direction, and at the same time the steering gear is operated to slide the block $r$ which carries the bearing $q$ in the guide frame $s$ when the machine turns about a vertical axis on the furrow wheel side of the plow. This movement allows of the wheels partaking of a transverse as well as a longitudinal direction so that the wheels are positioned for cutting the next furrow or row of furrows. The block $r$ is again brought, by means of the steering gear, into its central position in the slide frame $s$ and the machine proceeds at its work.

It will be seen from the above description that effective and easily operated steering is obtained. The vertical adjustment of the main frame can be effected while the machine is at work and a satisfactory balance of the engine and its accessories is obtained by placing it between the land and furrow wheels.

As above stated, modifications can be made without departing from the spirit of the invention and I do not limit myself to the machine as shown in the accompanying drawings.

What I claim and desire to secure by Letters Patent is:—

1. In a self-propelled plow the combination of a frame, an engine, two wheels mounted on spindles, driving gear between the engine and the wheels, a sleeve on one of said spindles, a drum, chains connecting said sleeve and said drum, worm gearing for rotating said drum, and steering bars for actuating said drum.

2. A self-propelled plow comprising a main frame, two wheels mounted on spindles and supported by the main frame, an engine positioned between the wheels, driving gear from the engine to the wheels, means for reversing the direction of the drive from the engine to the wheels, a sleeve on one of said spindles, a drum, chains connecting said sleeve and said drum, worm gearing for rotating said drum, and steering bars for actuating said drum.

In witness whereof I have hereunto set my hand in presence of two witnesses.

DANIEL YELD WHEATLEY.

Witnesses:
 HENRY FAIRBROTHER,
 LILY PARRY.